United States Patent
Collins et al.

(10) Patent No.: US 7,369,134 B2
(45) Date of Patent: May 6, 2008

(54) METHODS AND SYSTEMS FOR MULTIMEDIA MEMORY MANAGEMENT

(75) Inventors: Scott Collins, Boulder, CO (US); Mattias Fornander, Boulder, CO (US); Justin Ebert, Boulder, CO (US); Scott Saad, Boulder, CO (US)

(73) Assignee: Anark Corporation, Boulder, CO (US)

( * ) Notice: Subject to any disclaimer, the term of this patent is extended or adjusted under 35 U.S.C. 154(b) by 270 days.

(21) Appl. No.: 10/747,468

(22) Filed: Dec. 29, 2003

(65) Prior Publication Data

US 2005/0140683 A1   Jun. 30, 2005

(51) Int. Cl.
G06F 12/02 (2006.01)
G06T 9/00 (2006.01)
G06T 1/60 (2006.01)

(52) U.S. Cl. .................. 345/543; 345/555; 345/530

(58) Field of Classification Search ............. 345/543, 345/531, 530, 545, 542, 541, 555, 536, 419, 345/418
See application file for complete search history.

(56) References Cited

U.S. PATENT DOCUMENTS

| | | | |
|---|---|---|---|
| 5,742,797 A * | 4/1998 | Celi et al. ................. | 345/548 |
| 5,777,621 A | 7/1998 | Schneider et al. | |
| 5,808,617 A | 9/1998 | Kenworthy et al. | |
| 5,852,443 A | 12/1998 | Kenworthy | |
| 5,977,983 A | 11/1999 | Einkauf et al. | |
| 5,982,399 A * | 11/1999 | Scully et al. ............... | 345/522 |
| 5,987,582 A * | 11/1999 | Devic ....................... | 711/206 |
| 5,999,198 A | 12/1999 | Horan et al. | |
| 5,999,743 A | 12/1999 | Horan et al. | |
| 6,091,431 A | 7/2000 | Saxena et al. | |
| 6,286,083 B1 | 9/2001 | Chin et al. | |
| 6,300,956 B1 | 10/2001 | Apodaca et al. | |
| 6,326,973 B1 * | 12/2001 | Behrbaum et al. .......... | 345/532 |
| 6,333,750 B1 * | 12/2001 | Odryna et al. ............. | 345/629 |
| 6,366,289 B1 * | 4/2002 | Johns ........................ | 345/543 |
| 6,400,372 B1 | 6/2002 | Gossweiler, III et al. | |
| 6,999,087 B2 * | 2/2006 | Lavelle et al. .............. | 345/543 |
| 2002/0093507 A1 | 7/2002 | Olarig | |
| 2003/0071818 A1 * | 4/2003 | Wilt et al. .................. | 345/537 |

OTHER PUBLICATIONS

Multiresolution Tetrahedral Meshes: an Analysis and a Comparison, Emanuele Danovaro, Leila De Floriana, Michael Lee, Hanan Samet, pp. 1-9.
Distributed Rendering for Scalable Displays, Greg Humphreys, Ian Buck, Matthew Eldridge, Pat Hanrahan, Computer Science Department, Stanford University, 2000.
Performance—Time-Critical Computation Frameless Rendering, 1994 SigGraph paper, printed Oct. 2, 2002, from Internet website: http://www.cs.brown.edu/stc/resea/performance/performance_bibliography.html.

* cited by examiner

Primary Examiner—Kee M. Tung
Assistant Examiner—Joni Hsu
(74) Attorney, Agent, or Firm—Duft Bornsen & Fishman, LLP

(57) ABSTRACT

Methods and associated systems that allow a plurality of real-time multimedia applications to operate concurrently within a computer system with constrained primary memory. In particular, the methods and systems of the present invention allow for a plurality of real-time multimedia applications to operate concurrently while adapting to changing memory constraints imposed by the dynamic allocation and release of primary memory in a shared primary memory space.

28 Claims, 7 Drawing Sheets

METHODS AND SYSTEMS FOR MULTIMEDIA MEMORY MANAGEMENT

BACKGROUND OF THE INVENTION

1. Field of the Invention

The invention relates generally to real-time multimedia and more specifically relates to memory management methods and systems used in the rendering and display of real-time multimedia content on computer systems.

2. Discussion of Related Art

There exists a common media form known as "real-time multimedia." As known in the art, real-time multimedia generally involves the real-time construction, or rendering of graphical imagery on an end-user's computing device, and the subsequent display or presentation of the rendered imagery on a video monitor or viewing device. Computing devices used for executing real-time multimedia presentations may include end-user computers such as personal computers ("PCs"), set-top devices, personal digital assistants ("PDAs") and workstations (all referred to herein synonymously as "computers", "personal computers", "computer systems", "user systems", or "PCs").

In general, a real-time multimedia presentation is provided to the user as a sequence of 2-D images or frames generated from a set of media objects such as 2-D geometry, 3-D geometry, 2-D images, video, and text. The term "real-time" as used herein refers to the fact that a computer program is constructing, or dynamically rendering, a presentation image in time for it to be displayed without the viewer losing a sense of visual continuity. As known in the art, the process of rendering refers to the calculation of pixels from a set of media objects resulting in a 2-D image or frame. The term "visual continuity" refers to the ability to cause the human visual cortex to see a continuous progression of visual events from a time sequence of discrete frames or images that are displayed in quick succession. This technique is used in movie theaters, by displaying a time sequence of pictures at a rate of 24 frames per second. Experts in human vision and signal processing observe that visual continuity decreases as the rate at which a series of pictures is displayed decreases, also known as the "frame rate." There are many dependent factors that affect visual continuity at a given frame rate, such as the type of multimedia presentation and the activity of the media objects within the presentation, among other factors. Generally speaking, 6 to 7 frames per second may be considered low quality, 8 to 19 frames per second may be considered good quality, and 20 frames per second and above may be considered high quality for multimedia presentations. Visual continuity may be achieved for special purposes in special sequences of images at rates of 5 frames per second or lower. In general, for most common multimedia presentations, visual continuity requires a frame rate of at least 5 frames per second. As defined herein, visual continuity is maintained with a frame rate of 5 frames per second or greater. Therefore the term "real-time multimedia application", as used herein, refers to a computer program or application that is causing a sequence of images to be rendered and displayed at a frame rate of least 5 frames per second. Real-time multimedia applications are also known herein as "multimedia programs", "multimedia processes" and "multimedia threads", and more simply as "applications", "programs", "processes", and "threads".

Because each frame, or 2-D image, of a real-time multimedia presentation is usually constructed or rendered after the last frame was presented to the viewer, but before the time at which visual continuity would be suspended, input to the computer by a user can be received and affect the course of events in the presentation. Such interaction by the user allows the personal computer to produce an image, or frame, that differs from what would have been constructed and presented had the user not interacted with the presentation. This differs significantly from traditional video, where a series of static, pre-created images are displayed to a viewer in quick succession.

Multimedia applications are usually stored as descriptions that tell the computer how to use various media objects to construct, or render, frames of images through time. Additionally, such descriptions may instruct the computer as to how it should respond to user input during the presentation, allowing for increased utility for the user. Real-time multimedia applications can produce large quantities of visual information from relatively small descriptions based on mathematical and algorithmic descriptions, by combining and rendering media objects in real-time on a viewer's computer.

The data from which real-time multimedia presentation frames are rendered is known herein as "presentation data." As known in the art, presentation data may include 2-D images, such as textures and video, 2-D and 3-D geometric information, lighting information, blending information, camera information, view port information, implicit position information, implicit rotation information, implicit scaling information, explicit position information, explicit rotation information, explicit scaling information, so called "pixel shader" or high-level graphics instructions, and graphics processor unit (GPU) instructions, as well as other information used for rendering multimedia presentation frames in real-time. The size of the presentation data associated with a single multimedia application varies according to the size and complexity of the 2-D images, 2-D and 3-D geometric information, and other information that define the media objects and other attributes that compose the presentation data.

As the presentation data associated with a multimedia application is rendered into 2-D images, the resulting image data must be stored for subsequent display to a suitable display device. The storage size of the resulting image varies according to the dimensions of the image (measured in pixels) and the number of bytes required to represent each pixel in the image, among other factors. In addition to image data, other important information may be generated and stored during the process of rendering multimedia presentation frames.

Frequently, the amount of memory available to efficiently render a multimedia presentation in real-time is limited. As used herein, memory that is accessible by a graphics processor unit (GPU) for performing operations associated with graphics processing is known as "primary memory". Primary memory is used to store presentation data for the immediate rendering and storage of frames and associated data. Examples of primary memory may include, but are not limited to, registers or on-chip memory in a separate or integrated GPU, external cache memory associated with a separate or integrated GPU, video memory (VRAM) associated with a separate or integrated GPU, and main system memory (RAM) associated with a separate or integrated GPU. As known in the art, a GPU may be separate from the central processing unit (CPU), typically communicating through an appropriate computer system bus, or integrated partially or fully with a CPU. The memory area used to store multimedia applications with other associated data is known herein as "secondary memory." Examples of secondary memory may include, but are not limited to, registers or on-chip memory in a CPU, external cache memory associated with a CPU, and main system memory (RAM) associated with a CPU. Primary memory typically provides a computational performance advantage for the task of rendering and displaying multimedia presentation frames over the use of secondary memory, often because of technological or architectural differences within a computer system.

A problem arises when more than one multimedia application attempts to use the same limited, shared primary memory resources. As presently known in the art, the primary memory being used by one or more existing multimedia applications may be completely purged by another multimedia application-suspending the multimedia applications whose presentation data was purged until such time as the offending application exits and the memory becomes available again. Additionally, an application that attempts to allocate primary memory while one or more multimedia applications are active, may be prevented from allocating memory until such time as the memory becomes available or the application requests a smaller portion of memory. Cooperative sharing of primary memory between multimedia applications, either through direct or indirect coordination, does not occur in present multimedia presentation systems. Existing command structures for performing graphics processing such as DirectX and OpenGL are exemplary of such structures presently known in the art that exhibit such problems in the effective sharing of primary memory among multimedia applications.

Such constraints on the allocation and use of primary memory assets for the rendering and display of multimedia presentations are undesirable. Such constraints prevent the efficient, simultaneous use of primary memory by a plurality of multimedia applications in the instance where more primary memory is required than exists within the computer system.

In summary, present media systems are useful for individual real-time multimedia presentations, but fail to provide mechanisms that allow a plurality of real-time multimedia applications to operate concurrently on a computer system with a size-constrained, shared, primary memory pool.

SUMMARY OF THE INVENTION

The present invention solves the above and other problems, thereby advancing the state of the useful arts, by providing methods and associated systems that allow a plurality of real-time multimedia applications to operate concurrently within a computer system with constrained primary memory. In particular, the methods and systems of the present invention allow for a plurality of real-time multimedia applications to operate concurrently while adapting to changing memory constraints imposed by the dynamic allocation and release of primary memory in a size-constrained primary memory space.

In one embodiment, one or more real-time multimedia applications may successfully allocate a sufficient amount of memory from a shared primary memory pool for the rendering and display of the graphical elements described by their respective presentation data. The multimedia applications are then continuously or intermittently operable to produce image frames in real-time through the process of rendering. The frames are subsequently displayed on a display device. As is known in the art, the act of displaying typically requires one or more primary memory buffers, including a frame buffer that typically contains the 2-D image or frame to be displayed.

When a new or existing multimedia application attempts to allocate memory from the shared primary memory pool (i.e. requests memory), and memory sufficient to fill the request does not currently exist, an event is generated. Such an event (also known in the art as a condition, message, signal, request, indication, trigger, status, or exception) causes one or more of the plurality of multimedia applications (and/or a representative memory manager) to respond to the existing memory shortage.

In one embodiment, one or more of the plurality of multimedia applications respond to the event by scaling their respective presentation data, either directly with an associated memory management component, or through a memory manager, thereby reducing the amount of memory required for its storage, and then releasing memory back to the shared primary memory pool. As used herein, the terms "scaled" and "scaling" refer to operations that include, but are not limited to, texture bit-depth reductions, texture size modifications, texture substitutions, texture compression, buffer size modifications, buffer substitutions, 2-D and 3-D geometry resolution modifications and substitutions, presentation data modification and substitution techniques, and other operations and algorithms that may be applied to effect a memory savings for information stored in primary memory. Such data reduction techniques may result in a controlled degradation of the visual quality of the affected multimedia presentations, but can allow the requesting multimedia application to allocate memory sufficient to start or continue rendering and displaying frames in real-time, and allow the other multimedia applications to continue their respective operations without the interruption of visual continuity.

Conversely, when a multimedia application chooses to release all or a portion of its primary memory back to the shared memory pool, the other multimedia applications may then expand their respective use of primary memory. In such an instance, the presentation data and other primary memory buffers can be scaled upwards—increasing the amount of memory required for storage, but also increasing the visual quality of the rendered frames and hence the visual quality of the multimedia presentation for the user.

In another embodiment, a request for more memory by an existing or a new multimedia application that generates an exception as above may result in one or more of the applications releasing a portion of their allocated primary memory. The memory manager, or a memory management component associated with each presentation, may then cause each of the multimedia applications to reallocate its previously released portion such that each application, in turn, will share in the pool of available primary memory. The memory manager, or a memory management component associated with each presentation, may allow each application to utilize memory in a round-robin fashion, or based on a priority architecture or other sharing approaches.

Conversely, when a multimedia application chooses to release all or a portion of its primary memory back to the shared memory pool such that sufficient memory is available for the maximum needs of all applications, the multimedia applications may then expand their respective use of primary memory. In such an instance, the presentation data and other primary memory buffers can be reloaded into primary memory—increasing the amount of primary memory allocated for storage, but also increasing the speed with which frames may be rendered and displayed, as well as decreasing other associated latencies, thereby increasing the frame rate and hence the visual quality of the multimedia presentations for the user.

DETAILED DESCRIPTION OF THE DRAWINGS

Figure 1:
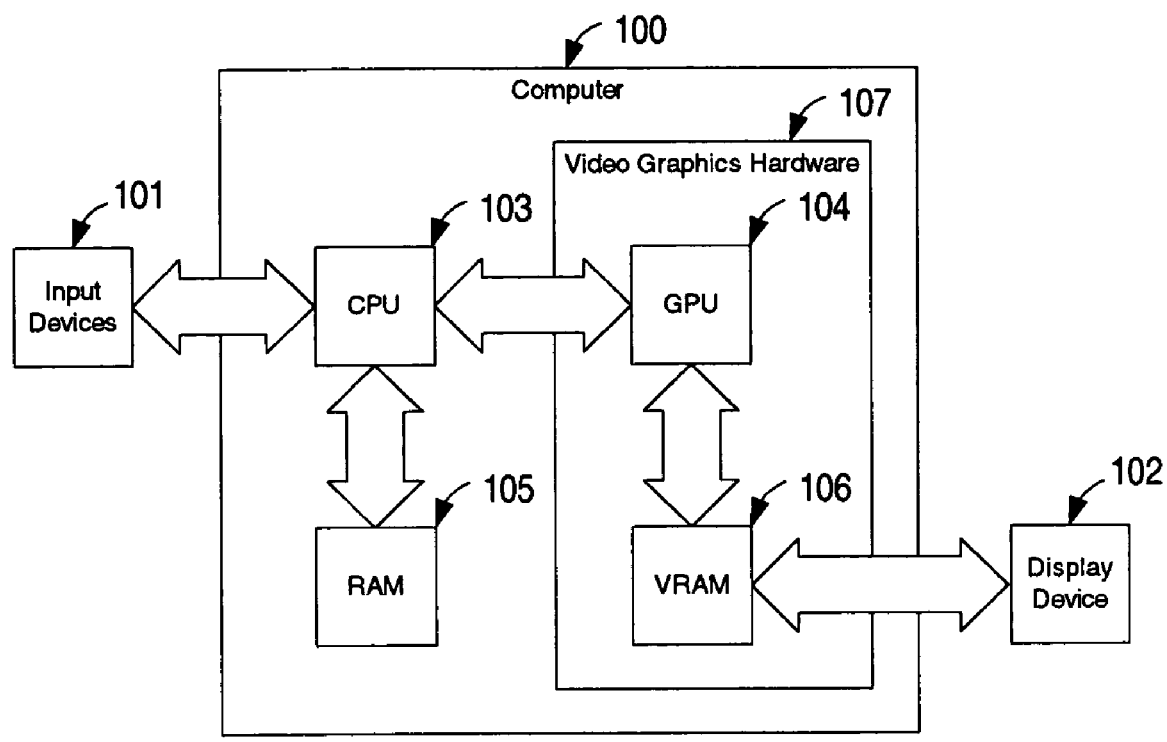
FIG. 1 is a block diagram of the various hardware components found on a typical personal computer in which features and aspects hereof may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram that provides an overview of a typical, exemplary context in which features and aspects hereof may operate. A user (not shown) may provide input to computer 100 via standard user input device(s) 101. Exemplary input devices include keyboards, pointing devices such as a mouse or tablet, voice command input, touch sensitive devices, joysticks, etc. The central processing unit (CPU) 103 in computer system 100 processes such input and may consequently modify data associated with multimedia applications stored in random access memory (RAM) 105. Presentation data or changes therein are communicated as data, instructions, and/or parameters to video graphics hardware 107 via standard system busses or special purpose video busses as known in the art. Such data, instructions, and/or parameters, as well as associated buffers, are stored in video memory 106 (VRAM) associated with a graphics processor unit 104 (GPU). The GPU 104 processes the data, instructions, and/or parameters to render a multimedia presentation frame stored in associated buffers in video memory 106 which is, in turn, presented on display device 102.

Figure 2:
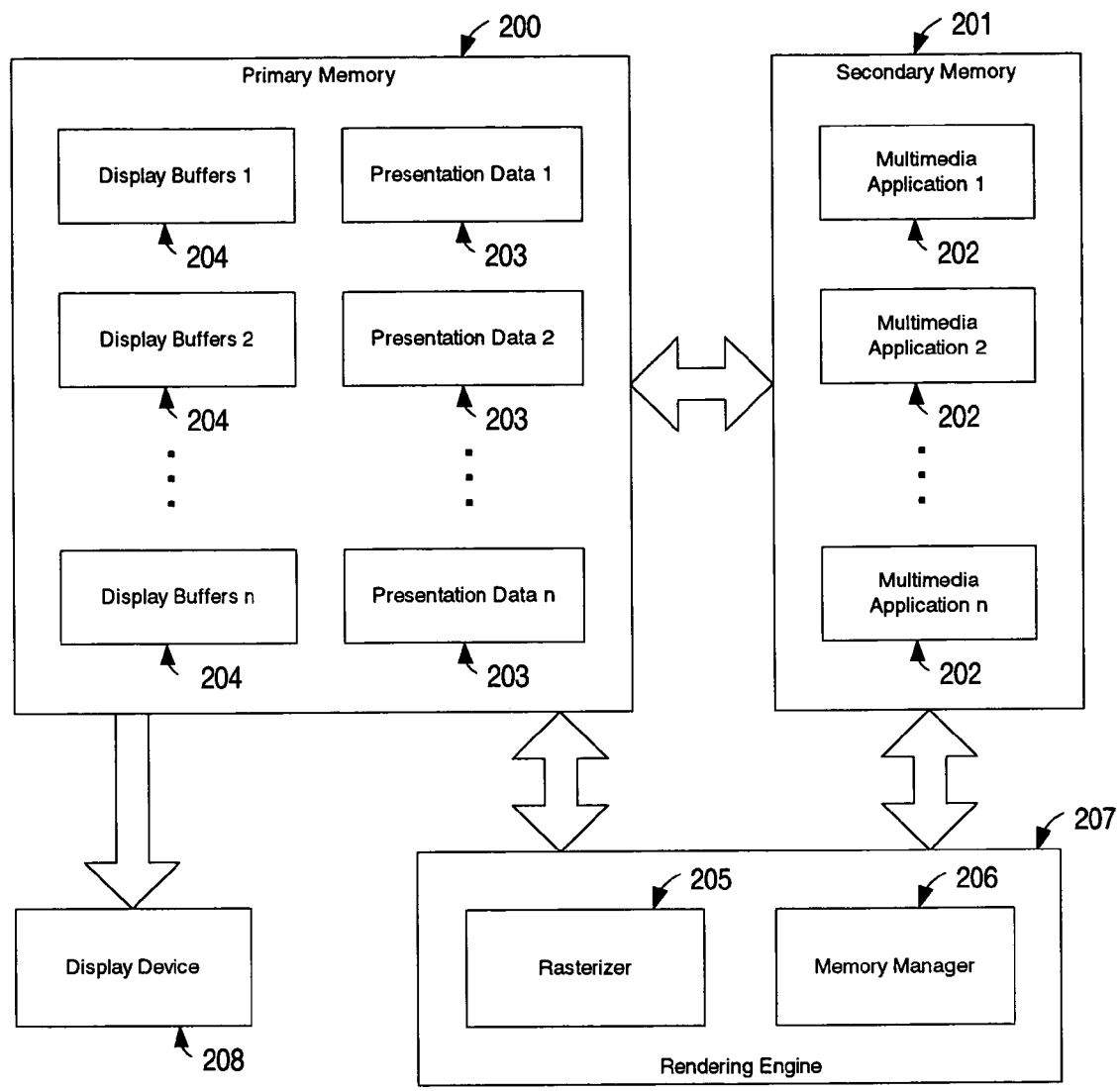
FIG. 2 is a block diagram of elements of a system in accordance with features and aspects hereof that provide mechanisms to allow a plurality of multimedia applications to operate concurrently on a computer system with a size-constrained, shared, primary memory pool.

FIG. 2 is a block diagram of elements of a system in accordance with features and aspects hereof that provide mechanisms to allow a plurality of multimedia applications to operate concurrently on a computer system with a size-constrained, shared, primary memory pool.

Secondary memory 201 contains a plurality of multimedia applications 202, wherein each of the multimedia applications 202 may be operable to allocate primary memory 200 for the storage of associated presentation data 203 and display buffers 204. Those skilled in the art will recognize that the methods hereof may be equivalently implemented in a system having no hierarchically defined primary versus secondary memory but rather all memory being used for all purposes, i.e., only a primary memory. A rendering engine 207 contains a rasterizer 205 and a memory manager 206. Rasterizer 205 may be operable to render a frame or image from presentation data 203, wherein the resulting frame is stored in associated display buffers 204 and subsequently displayed to a display device 208. As used herein, the term "display buffers" refers to a collection of common rendering processing buffers such as, but not limited to, frame buffers, back buffers, z-buffers, stencil buffers, intermediate results buffers, and other memory buffers known in the art for the efficient rendering and display of image frames. As known in the art, a rasterizer is a process responsible for rasterization, the steps of determining pixel values from input presentation data.

Memory manager 206 is operable to manage or coordinate the use of shared, primary memory 200 by a plurality of multimedia applications 202. Memory manager 206 may be separate from the multimedia applications 202 whose memory it is managing, or aspects may be partially or fully integrated within each multimedia application 202 to manage the use of a shared primary memory 200. Such variations are exemplified by FIG. 6 and FIG. 7.

Figure 3:
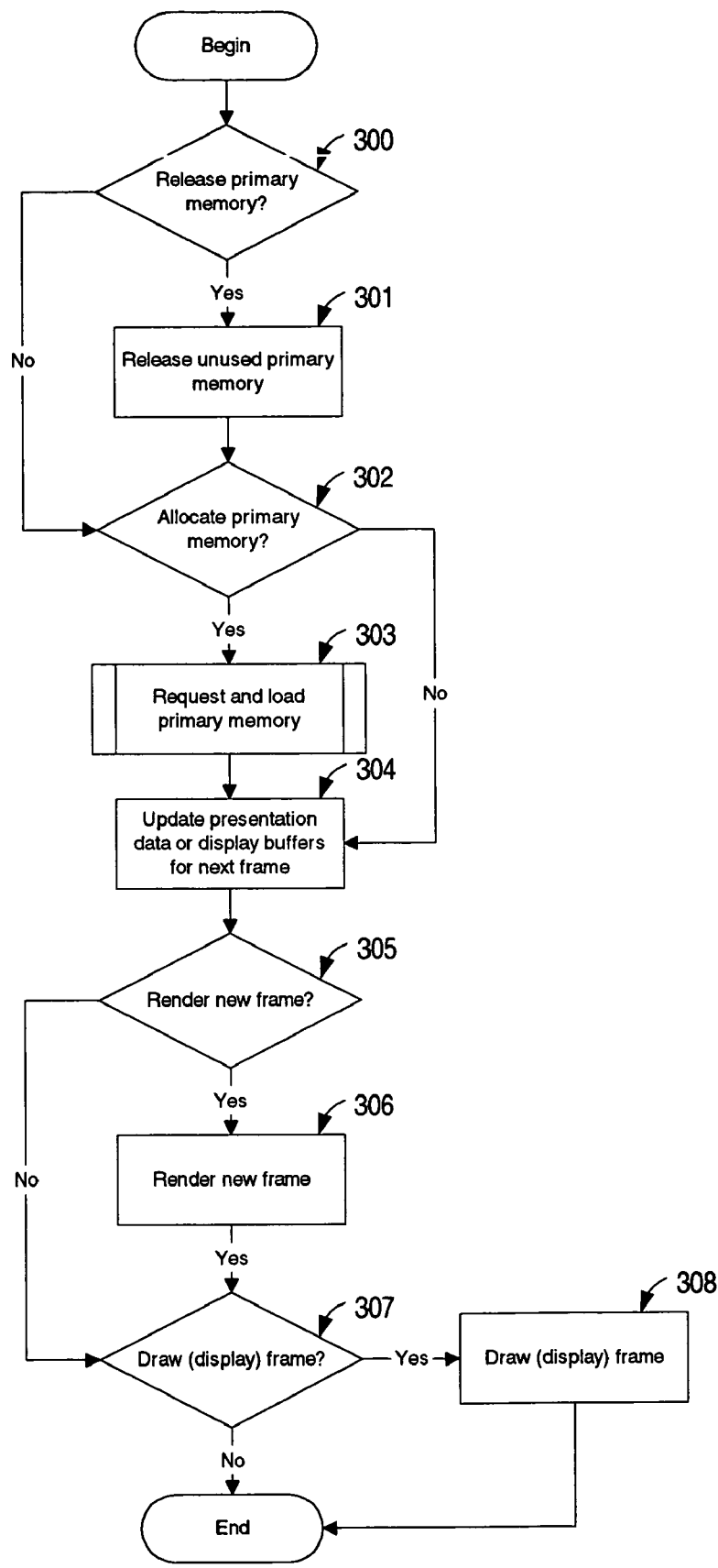
FIG. 3 is a flowchart describing an exemplary process of primary memory management performed by a multimedia application in accordance with features and aspects hereof.

FIG. 3 is a flowchart describing an exemplary process of primary memory management performed by a multimedia application in accordance with features and aspects hereof. Such a process allows for a plurality of real-time multimedia applications to operate concurrently, without interruption of visual continuity, while adapting to changing memory constraints imposed by the dynamic allocation and release of primary memory in a size-constrained primary memory space. The management of primary memory may be effected during the normal course of operations by the repetitive execution of the process of FIG. 3 by the individual multimedia applications in a plurality of multimedia applications 202 (FIG. 2). Those skilled in the art will recognize that such a process may be implemented with suitable priority schemes governing the allocation and usage of primary memory 200 (FIG. 2).

Element 300 of FIG. 3 determines if the present multimedia application has primary memory that it seeks to release back into the pool of available primary memory. Such an event may occur from time to time when a multimedia application no longer needs to render particular media objects, or when a multimedia application suspends temporarily or exits completely, among other reasons. If the present multimedia application seeks to release primary memory, processing continues with element 301 to release primary memory back to the pool of available primary memory, after which processing continues with element 302. If the present multimedia application does not seek to release primary memory, processing continues with element 302.

Element 302 of FIG. 3 determines if the present multimedia application is requesting primary memory (i.e., allocating primary memory). Such an event may occur when the multimedia application is first loading, or from time to time when the application continues operation after a period of suspension, or to reload presentation data 203 (FIG. 2) or display buffers 204 (FIG. 2), among other reasons. If the present application seeks to allocate primary memory, processing continues with element 303. If the present application does not seek to allocate primary memory, processing continues with element 304.

Element 303 requests primary memory 200 (FIG. 2) for the present application, and if possible, loads and stores applicable presentation data or display buffers in primary memory facilitated by memory manager 206 (FIG. 2). Step 303 is further detailed in FIGS. 4 and 5, describing two aspects hereof. After performing element 303, processing continues with element 304.

Element 304 updates the present application's presentation data or display buffers in preparation for rendering the next frame of the presentation. Such an update may be performed to reflect changes to the various properties of media objects through time, such as position, rotation and lighting properties, among other information that needs to be reflected in the rendered frame for display. Processing continues with element 305.

Element 305 determines if the present multimedia application seeks to render a new frame to be stored in one or more of the display buffers 204 (FIG. 2). The present application may not seek to render a frame for display if the application is suspending temporarily or permanently, or if sufficient primary memory could not be allocated in element 303, among other reasons. If the present application seeks to render a frame, processing continues with element 306, otherwise the processing continues with element 307.

In element 306, the rasterizer 205 (FIG. 2) renders an image from presentation data 203 (FIG. 2) and stores the resulting frame in display buffers 204 (FIG. 2) for display to an appropriate display device 208 (FIG. 2). Such a process of calculating pixel values from presentation data 203 (FIG. 2) is well known in the art and need not be discussed further herein. After element 306 completes, processing continues with element 307.

Element 307 determines if the present multimedia application seeks to draw or display all or a portion of the rendered frame to a suitable display device 208 (FIG. 2). If the present application does not seek to display a frame, the process exits to be restarted in time to generate a next frame from the presentation data 203 (FIG. 2). If the present application seeks to display a frame, processing continues with element 308.

In element 308, rendering engine 207 (FIG. 2) is operable to copy memory from an associated back buffer contained within display buffers 204 (FIG. 2) to an associated frame buffer contained within display buffers 204 (FIG. 2), which is made available for display to a suitable display device 208 (FIG. 2). The image now contained within the frame buffer is subsequently displayed to display device 208 (FIG. 2) and the process exits to be restarted in time to generate a next frame from the presentation data 203 (FIG. 2). Those of ordinary skill in the art will recognize that the process of rasterization performed in element 306 may optionally draw (write) directly to a frame buffer, bypassing the use of a back buffer completely.

Figure 4:
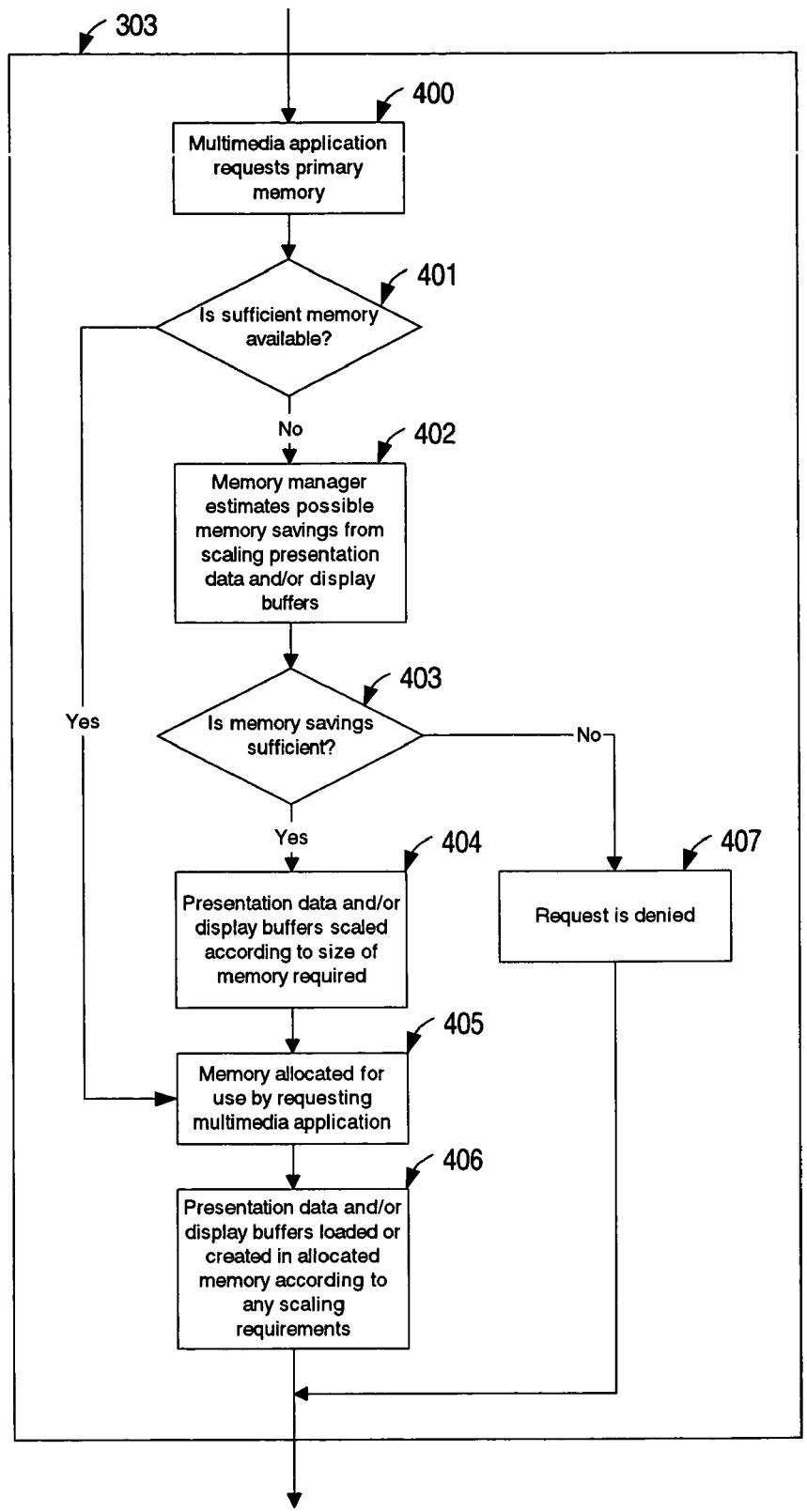
FIG. 4 is a flowchart providing details of element 303 of FIG. 3, describing an exemplary process of primary memory management through scaling in accordance with features and aspects hereof.

FIG. 4 is a flowchart providing details of element 303 of FIG. 3, describing an exemplary process of primary memory management through scaling in accordance with features and aspects hereof. In element 400, the present multimedia application requests primary memory from memory manager 206 (FIG. 2) for the storage of presentation data 203 (FIG. 2) and/or display buffers 204 (FIG. 2) for the rendering and display of image frames. In element 401, the memory manager determines if sufficient primary memory exists to grant the memory request without the cooperation or involvement of other multimedia applications and their respective use of primary memory. If sufficient memory exists, processing continues with element 405 operable to allocate primary memory for the present application. If however, sufficient memory does not exist for the present memory request, processing continues with element 402.

In element 402, the memory manager 206 (FIG. 2) estimates possible memory savings from primary memory being used currently by other multimedia applications. Such an estimate will be based on the memory that may be freed by the scaling of presentation data, display buffers, or both. Note that such a calculation of memory savings may also include estimated savings from the present multimedia application and from primary memory currently being used, as well as savings that may be had by scaling data that is yet to be loaded or created in the requested primary memory, if so granted.

In element 403, the memory manager, or similarly, a memory management component of the present multimedia application, determines if the calculated memory savings is sufficient to grant the primary memory request from the present application. If the amount of memory savings is not sufficient, the memory manager 206 (FIG. 2) denies the present request in element 407 thereby completing processing of element 303. If the amount of memory savings is sufficient, processing continues with element 404.

In element 404, the presentation data and/or the display buffers currently in use by other multimedia applications are scaled in order to free primary memory to fulfill the memory request from the present multimedia application. Note that such a process may involve releasing existing presentation data and/or display buffers from primary memory, and subsequently reloading smaller versions into primary memory. Alternately, such a process may occur through scaling operations enacted directly on the contents of primary memory, effecting the appropriate memory savings. When the appropriate degree of scaling has been completed, processing continues with element 405.

In element 405, primary memory is reallocated for use by the requesting multimedia process, wherein the factual details of the allocation are typically noted by the memory manager 206 (FIG. 2) for use in future memory management activities. Notice that it is possible that the amount of memory allocated may be less than was requested by the present multimedia application, requiring scaling when loading or creating the presentation data and/or display buffers. Processing continues with element 406 in which the present multimedia process loads or creates presentation data and/or display buffers, storing such information in the allocated primary memory for use in the rendering and displaying of frames. As already noted, such a process may involve scaling the loaded or created presentation data and/or display buffers. Once the presentation data and/or display buffers are loaded or created in primary memory, the routine exits.

Figure 5:
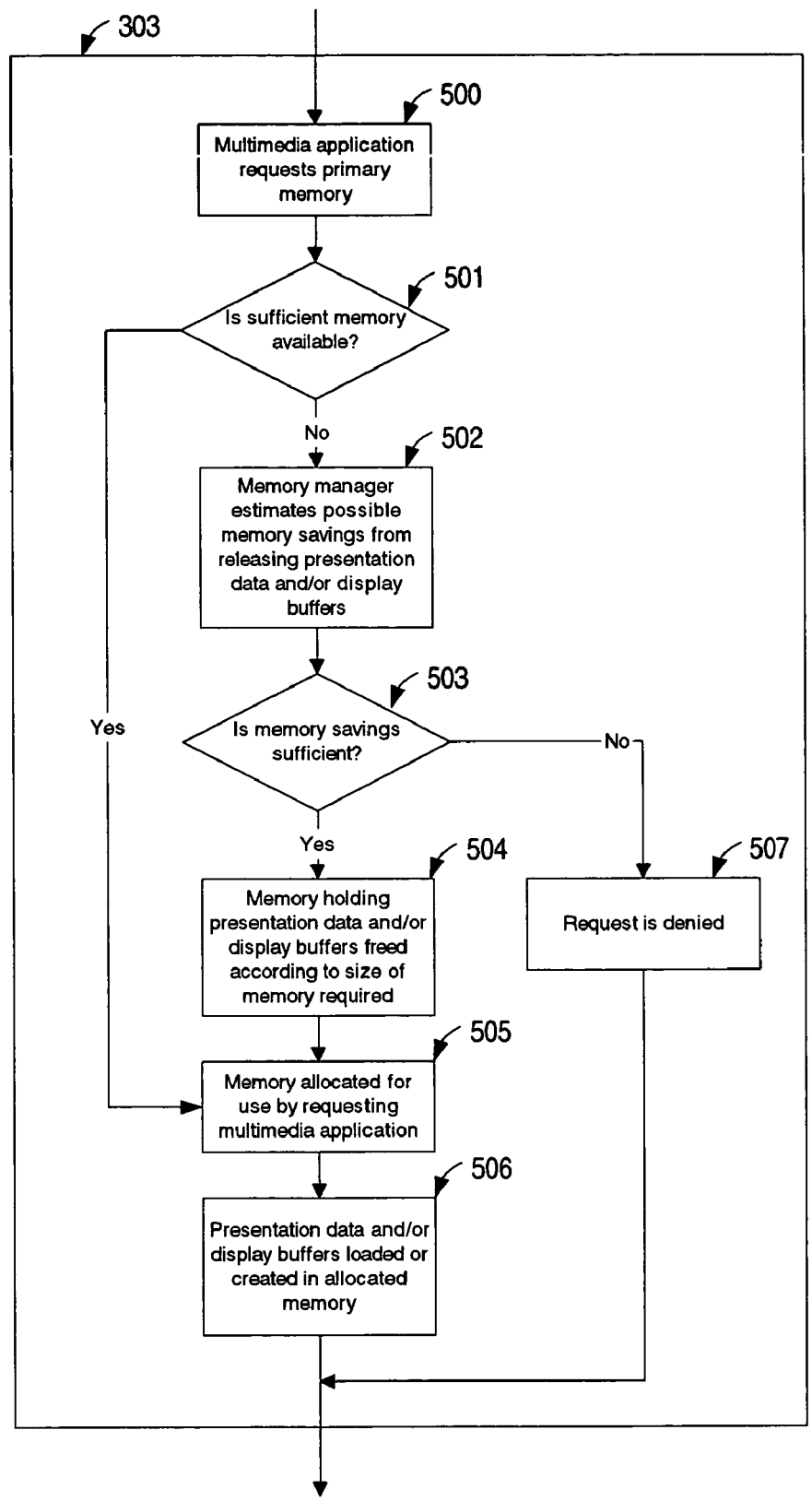
FIG. 5 is a flowchart providing details of element 303 of FIG. 3, describing an exemplary process of primary memory management through releasing in accordance with features and aspects hereof.

FIG. 5 is a flowchart providing details of element 303 of FIG. 3, describing another exemplary process of primary memory management through releasing in accordance with other features and aspects hereof. The processing of FIG. 5 is similar to that of FIG. 4 except that instead of using scaling operations as in FIG. 4, FIG. 5 releases appropriate presentation data and/or display buffers associated with existing multimedia applications in order to free primary memory to fulfill the present memory request. Unlike FIG. 4, the multimedia processes that had a portion of their respective primary memory released (by a prior multimedia application's memory allocation) may be required to procure sufficient primary memory before becoming operational once again. Thus, by intermittently taking turns using the constrained available memory from the shared primary memory pool, the plurality of real-time multimedia applications may operate concurrently.

In particular, elements 502 and 504 of FIG. 5 estimate and realize, respectively, the memory savings available from releasing portions of primary memory presently allocated to the corresponding multimedia application. By contrast, corresponding elements 402 and 404 of FIG. 4 estimate and realize, respectively, the memory savings available from scaling of the presently allocated primary memory for the corresponding application. Still further, yet other features and aspects hereof may combine the features of scaling and releasing to achieve desired memory management on behalf of a plurality of concurrently operating multimedia applications.

Figure 6:
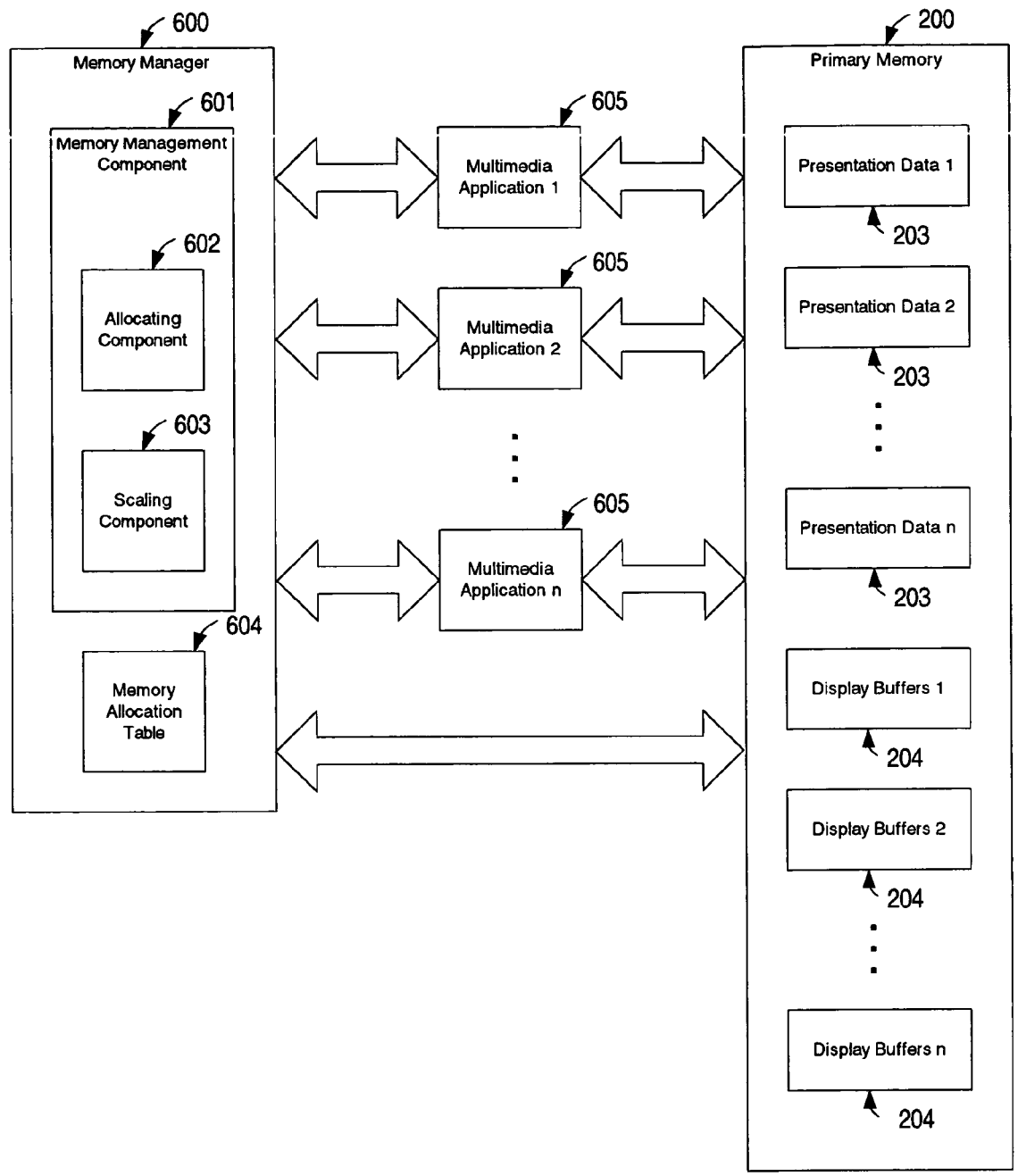
FIG. 6 is a block diagram of the various system components where memory management is centralized in a memory manager 600 in accordance with features and aspects hereof.

FIG. 6 is a block diagram of the various system components where memory management is centralized in a memory manager 600 in accordance with features and aspects hereof. The memory manager 600 is operable to manage the allocation and release (de-allocation) of primary memory 200 for multimedia applications 605. The memory manager 600 contains a memory management component 601, operable to effect a change in the allocation of primary memory 200 used by multimedia applications 605 in the event that more primary memory 200 is required than is currently available. Memory allocation table 604 may be used by memory management component 601 to record information regarding memory allocated by each of the multimedia applications 605. Use and structure of such a table as well as numerous equivalent structures and techniques for such memory management will be readily apparent to those skilled in the art. The memory management component 601 contains an allocating component 602, operable for allocating and releasing primary memory 200 for multimedia applications 605, and a scaling component 603, operable for scaling presentation data 203 and/or display buffers 204 associated with multimedia applications 605.

Figure 7:
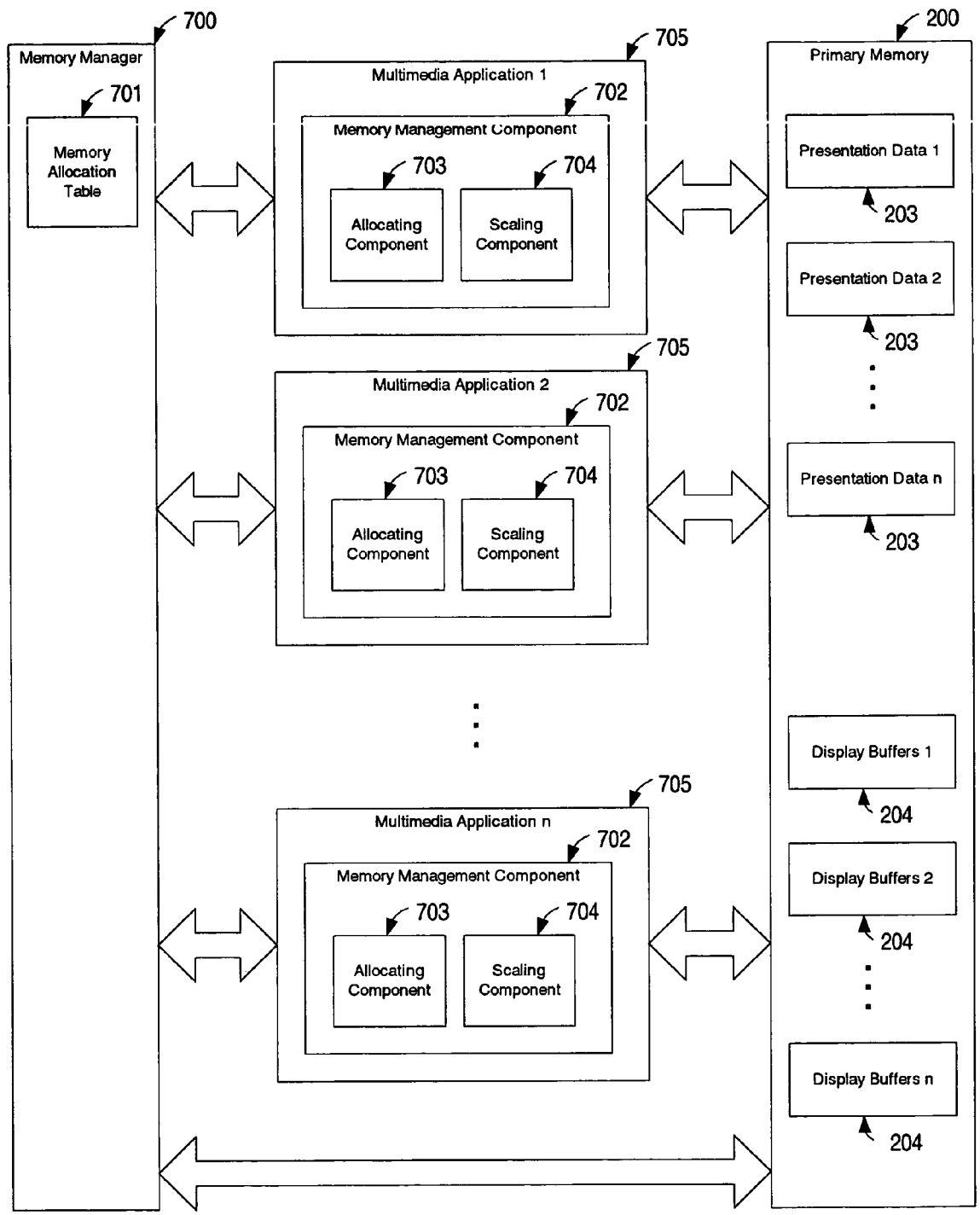
FIG. 7 is a block diagram of the various system components where memory management is partially distributed among a plurality of multimedia applications 705 in accordance with features and aspects hereof.

FIG. 7 is a block diagram of the various system components where memory management is partially distributed among a plurality of multimedia applications 705 in accordance with features and aspects hereof. A memory manager 700 is operable to coordinate the allocation and release (de-allocation) of primary memory 200 for multimedia applications 705. The memory manager 700 contains a memory allocation table 701, operable to store information about primary memory 200 use by multimedia applications 705. The multimedia applications 705 each have an associated memory management component 702, operable to effect a change in their allocation of primary memory 200 in the event that more primary memory 200 is required than is currently available. Each memory management component 702 contains an allocating component 703, operable for allocating and releasing primary memory 200 for multimedia applications 705, and a scaling component 704, operable for scaling presentation data 203 and/or display buffers 204 associated with multimedia applications 705.

Those skilled in the art will recognize a wide variety of equivalent steps in the methods of FIGS. 3, 4, and 5 as well as a variety of equivalent sequences and ordering of the steps. Such design choices are well known to those of ordinary skill in the art. Further, those skilled in the art will recognize that the methods of FIGS. 3, 4, and 5, and the features of FIGS. 2, 6, and 7 may be equivalently implemented as custom circuits in an enhanced video display adapter such as video graphics hardware 107 (FIG. 1) or as software programmed to operate a special-purpose or general-purpose processor. Such a programmed processor may, in turn, reside on an enhanced display adapter or may be a general-purpose processor within a personal computer.

While the invention has been illustrated and described in detail in the drawings and foregoing description, such illustration and description is to be considered as exemplary and not restrictive in character, it being understood that only the preferred embodiments and minor variants thereof have been shown and described and that all changes and modifications that come within the spirit of the invention are desired to be protected.

What is claimed is:

1. A system for memory management for concurrent graphics processing, said system comprising:
   a plurality of multimedia applications;
   a primary memory operable for storing presentation data and display buffers associated with each of said plurality of multimedia applications, wherein the presentation data includes 3-D geometric information;
   a rasterizer coupled to said primary memory to receive said presentation data as input and operable to render 2-D images from said presentation data and to store rendered 2-D images in the display buffers wherein the received presentation data includes 3-D geometric information; and
   a memory manager coupled to said primary memory and coupled to said plurality of multimedia applications to adjust an amount of use of said primary memory by at least one of the plurality of multimedia applications to permit said plurality of multimedia applications to operate concurrently, wherein the adjustment further comprises scaling portions of said presentation data to make available a portion of said primary memory wherein the portions of said presentation data scaled by the memory manager include 3-D geometric information.

2. The system of claim 1 wherein each multimedia application of said plurality of multimedia applications farther comprises:
   a memory management component communicatively coupled with said memory manager to reduce the amount of use of said primary memory used by at least one of said plurality of multimedia applications.

3. The system of claim 1 wherein said memory manager farther comprises:
   a memory management component to reduce the amount of use of said primary memory used by at least one of said plurality of multimedia applications; and
   a memory allocation table to store information concerning the allocation of primary memory by said plurality of multimedia applications.

4. The system of claim 2 or claim 3 wherein said memory management component further comprises:
   an allocating component to allocate and release portions of said presentation data in said primary memory associated with said at least one of said plurality of multimedia applications.

5. The system of claim 2 or claim 3 wherein said memory management component further comprises:

a scaling component to scale portions of said display buffers in said primary memory associated with said at least one of said plurality of multimedia applications.

6. The system of claim 2 or claim 3 wherein said memory management component further comprises:
an allocating component to allocate and release portions of said display buffers in said primary memory associated with said at least one of said plurality of multimedia applications.

7. The system of claim 1 further comprising:
a user input device communicatively coupled with at least one application of said plurality of multimedia applications wherein said at least one application generates requests to said memory manager in response to receipt of input from said user input device.

8. A computer operable method for managing memory used by a plurality of multimedia applications comprising the steps of:
initiating concurrent operation of said plurality of multimedia applications wherein each of said plurality of multimedia applications stores presentation data and display buffers in a shared primary memory, wherein the presentation data includes 3-D geometric information;
managing an amount of use of said shared primary memory by the concurrently operating said plurality of multimedia applications, whereby said managing includes a dynamic adjustment of an amount of said shared primary memory used by at least one of the concurrently operating said plurality of multimedia applications, wherein the adjustment further comprises scaling portions of said presentation data to make available a portion of said primary memory, and wherein the portions of said presentation data scaled by the step of managing include 3-D geometric information; and
rendering 2-D images from said presentation data and storing the rendered 2-D images in the display buffers wherein said presentation data includes 3-D geometric information.

9. The method of claim 8 wherein the step of managing further comprises the steps of:
receiving a request for additional space in said shared primary memory from a requesting application of said plurality of multimedia applications;
determining whether sufficient space is available in said shared primary memory; and
reallocating memory in said shared primary memory presently allocated for use by another application of said plurality of multimedia applications for use by said requesting application in response to a determination that there exists insufficient space in said shared primary memory to fulfill the request.

10. The method of claim 9 wherein the step of reallocating further comprises the steps of:
requesting at least one application of said plurality of multimedia applications to scale portions of said presentation data stored in said shared primary memory allocated to said at least one application to generate unused primary memory space; and
allocating a portion of said unused primary memory space for use by said requesting application.

11. The method of claim 9 wherein the step of reallocating further comprises the steps of:
requesting at least one application of said plurality of multimedia applications to release portions of said presentation data stored in said shared primary memory allocated to said at least one application to generate unused primary memory space; and
allocating a portion of said unused primary memory space for use by said requesting application.

12. The method of claim 9 wherein the step of reallocating further comprises the steps of:
requesting at least one application of said plurality of multimedia applications to scale portions of said display buffers stored in said shared primary memory allocated to said at least one application to generate unused primary memory space; and
allocating a portion of said unused primary memory space for use by said requesting application.

13. The method of claim 9 wherein the step of reallocating further comprises the steps of:
requesting at least one application of said plurality of multimedia applications to release portions of said display buffers stored in said shared primary memory allocated to said at least one application to generate unused primary memory space; and
allocating a portion of said unused primary memory space for use by said requesting application.

14. The method of claim 8 further comprising:
receiving user input within at least one application of said plurality of multimedia applications, wherein the step of managing is responsive to the received user input.

15. A system for managing memory for multimedia applications comprising:
a plurality of multimedia applications operable substantially concurrently for presenting multimedia presentations;
a shared primary memory coupled to each of said plurality of multimedia applications for storing presentation data and display buffers associated with each of said plurality of multimedia applications, wherein the presentation data includes 3-D geometric information used as input for rendering 2-D images; and
management means, associated with said plurality of multimedia applications, for managing an amount of use of said shared primary memory by the concurrently operating said plurality of multimedia applications whereby said managing includes a dynamic adjustment of primary memory use of at least one of the concurrently operating said plurality of multimedia applications, wherein the adjustment further comprises scaling portions of said presentation data to make available a portion of said primary memory, and wherein the portions of said presentation data scaled by the memory management means includes 3-D geometric information.

16. The system of claim 15 wherein the management means further comprises:
means for receiving a request for additional space in said shared primary memory from a requesting application of said plurality of multimedia applications;
means for determining whether sufficient space is available in said shared primary memory; and
means for reallocating memory in said shared primary memory presently allocated for use by another application of said plurality of multimedia applications for use by said requesting application in response to a determination that there exists insufficient space in said shared primary memory to fulfill the request.

17. The system of claim 16 wherein the means for reallocating further comprises:
means for requesting at least one application of said plurality of multimedia applications to scale portions of said presentation data stored in said shared primary memory allocated to said at least one application to generate unused primary memory space; and means for allocating a portion of said unused primary memory space for use by said requesting application.

18. The system of claim 16 wherein the means for reallocating further comprises:
means for requesting at least one application of said plurality of multimedia applications to release portions of said presentation data stored in said shared primary memory allocated to said at least one application to generate unused primary memory space; and
means for allocating a portion of said unused primary memory space for use by said requesting application.

19. The system of claim 16 wherein the means for reallocating further comprises:
means for requesting at least one application of said plurality of multimedia applications to scale portions of said display buffers stored in said shared primary memory allocated to said at least one application to generate unused primary memory space; and
means for allocating a portion of said unused primary memory space for use by said requesting application.

20. The system of claim 16 wherein the means for reallocating further comprises:
means for requesting at least one application of said plurality of multimedia applications to release portions of said display buffers stored in said shared primary memory allocated to said at least one application to generate unused primary memory space; and
means for allocating a portion of said unused primary memory space for use by said requesting application.

21. The system of claim 15 further comprising:
user input means communicatively coupled to at least one application of said plurality of multimedia applications and communicatively coupled to said management means, wherein the management means is responsive to input received from the user input means.

22. A computer readable storage medium tangibly embodying program instructions for a method for managing memory used by a plurality of multimedia applications, the method comprising the steps of:
initiating concurrent operation of said plurality of multimedia applications wherein each of said plurality of multimedia applications stores presentation data and display buffers in a shared primary memory, wherein the presentation data includes 3-D geometric information;
managing an amount of use of said shared primary memory by the concurrently operating said plurality of multimedia applications, whereby said managing includes a dynamic adjustment of an amount of said shared primary memory used by at least one of the concurrently operating said plurality of multimedia applications, wherein the adjustment further comprises scaling portions of said presentation data to make available a portion of said primary memory, and wherein the portions of said presentation data scaled by the step of managing includes 3-D geometric information; and
rendering 2-D images from said presentation data and storing the rendered 2-D images in the display buffers wherein the presentation data includes 3-D geometric information.

23. The medium of claim 22 wherein the method step of managing further comprises the steps of:
receiving a request for additional space in said shared primary memory from a requesting application of said plurality of multimedia applications;
determining whether sufficient space is available in said shared primary memory; and
reallocating memory in said shared primary memory presently allocated for use by another application of said plurality of multimedia applications for use by said requesting application in response to a determination that there exists insufficient space in said shared primary memory to fulfill the request.

24. The medium of claim 23 wherein the method step of reallocating further comprises the steps of:
requesting at least one application of said plurality of multimedia applications to scale portions of said presentation data stored in said shared primary memory allocated to said at least one application to generate unused primary memory space; and
allocating a portion of said unused primary memory space for use by said requesting application.

25. The medium of claim 23 wherein the method step of reallocating further comprises the steps of:
requesting at least one application of said plurality of multimedia applications to release portions of said presentation data stored in said shared primary memory allocated to said at least one application to generate unused primary memory space; and
allocating a portion of said unused primary memory space for use by said requesting application.

26. The medium of claim 23 wherein the method step of reallocating further comprises the steps of:
requesting at least one application of said plurality of multimedia applications to scale portions of said display buffers stored in said shared primary memory allocated to said at least one application to generate unused primary memory space; and
allocating a portion of said unused primary memory space for use by said requesting application.

27. The medium of claim 23 wherein the method step of reallocating further comprises the steps of:
requesting at least one application of said plurality of multimedia applications to release portions of said display buffers stored in said shared primary memory allocated to said at least one application to generate unused primary memory space; and
allocating a portion of said unused primary memory space for use by said requesting application.

28. The medium of claim 22 wherein the method further comprises:
receiving user input within at least one application of said plurality of multimedia applications, wherein the step of managing is responsive to the received user input.

* * * * *